UNITED STATES PATENT OFFICE.

CARLETON ELLIS, OF LARCHMONT, NEW YORK, ASSIGNOR TO CHADELOID CHEMICAL COMPANY, A CORPORATION OF WEST VIRGINIA.

COMPOSITION FOR ERASING TRACING-INK, &c.

997,910.  Specification of Letters Patent.  Patented July 11, 1911.

No Drawing.  Application filed December 26, 1908.  Serial No. 469,297.

*To all whom it may concern:*

Be it known that I, CARLETON ELLIS, a citizen of the United States, residing at Larchmont, in the county of Westchester and State of New York, have invented certain new and useful Improvements in Composition for Erasing Tracing-Ink, &c., of which the following is a specification.

This invention relates to a composition designed for erasing india ink lines from ordinary tracing paper such as is employed by draftsmen in copying drawings for the purpose of making blue prints.

It particularly relates to a composition comprising volatile organic bodies forming a carrier for an erasing abrasive and free from injurious action on the tracing paper.

The various aqueous and alkaline solutions employed for the removal of ink from tracing paper have usually some injurious action on the paper, destroying its gloss or finish, causing stains and even changing the texture of the paper so that the subsequent application of ink results in an unsightly blot. The resinous sizes or oily materials employed in making such tracing paper are very readily attacked by most solvent material causing the paper to wrinkle, and removing from its surface, that peculiar finish which allows the tracing ink to be applied properly.

The present invention involves a composition of matter having no action on the sizing and filling materials employed in making tracing paper but which has a specific erasing action on the drawing ink removing the latter readily without impairing the surface of the paper in any way.

My composition comprises a carrier composed of certain organic bodies of a volatile character and an erasing abrasive material and I preferably employ a mixture of a slightly acid character so as to somewhat more readily remove the ink and entirely preclude injurious action on the sizing. I do not however make use of such a proportion of acid that the composition is given disagreeable or corrosive qualities. A suitable composition comprising these constituents consists of benzol 20 parts, wood alcohol 25 parts, glacial acetic acid 2 parts and pumice 10 parts. Another composition consists of benzin 10 parts, acetone 20 parts, lactic acid 1 part and tripoli 10 parts. Still another composition consists of wood alcohol 40 parts, hydrochloric acid 1 part, silex 15 parts.

In applying this composition, the contents of the receptacle are first well shaken and a small quantity poured out on a sponge or swab. The latter is rubbed over the lines to be effaced until the ink is entirely removed. The adhering abrasive is then wiped or brushed off when the paper may be re-inked if desired. After such application, the paper will be found uninjured as neither the sizing or fiber is affected by the slight mechanical action exerted in removing the ink lines.

What I claim as my invention is:—

1. A composition for erasing ink lines from tracing paper which consists of benzol, alcohol, an acid and an abrasive.

2. A composition for erasing ink lines from tracing paper which consists of benzol, alcohol, acetic acid and an abrasive.

In testimony whereof I have affixed my signature in presence of two witnesses.

CARLETON ELLIS.

Witnesses:
NATHANIEL L. FOSTER,
FRANCES Q. NEWMAN.